United States Patent [19]

McFadden

[11] Patent Number: 4,585,195
[45] Date of Patent: Apr. 29, 1986

[54] UNIVERSAL JOINT

[76] Inventor: Joseph T. McFadden, 1010 Llewllyn Mews, Norfolk, Va. 23508

[21] Appl. No.: 582,775

[22] Filed: Feb. 23, 1984

[51] Int. Cl.[4] ............................................. F16B 1/04
[52] U.S. Cl. .................................... 248/118; 248/278; 248/122; 403/374; 403/205; 403/303; 269/75
[58] Field of Search ......... 248/118, 278, 122, DIG. 4; 403/205, 403, 303, 374; 269/166, 167, 168, 169, 170, 328, 75; 5/437

[56] References Cited

U.S. PATENT DOCUMENTS

| 1,203,071 | 10/1916 | Straub | 269/170 |
| 2,391,143 | 12/1945 | Ertner | 269/170 |
| 2,567,571 | 9/1951 | Merriman | 269/170 |
| 2,928,686 | 3/1960 | Newkirk | 287/12 |
| 4,157,876 | 6/1979 | DiGiulio | 403/90 |
| 4,265,561 | 5/1981 | Heckele | 403/3 |

FOREIGN PATENT DOCUMENTS 823556 9/1969 Canada ............................. 269/328

Primary Examiner—Ramon S. Britts
Assistant Examiner—Karen J. Chotkowski
Attorney, Agent, or Firm—Banner, Birch, McKie & Beckett

[57] ABSTRACT

A universal joint which permits global positioning of an object and a locking mechanism for securely and positively locking the universal joint in any position to which it can moved. The universal joint of the present invention may be used in series or singly to provide a mechanism for positioning and locking an object such as, for example, a headrest or a lamp, in any position within a spherical range.

9 Claims, 4 Drawing Figures

UNIVERSAL JOINT

BACKGROUND OF THE INVENTION

This invention relates to a locking universal joint. The joint of the present invention permits global, three-dimensional positioning of an object. The universal joint of the present invention may be used in series of singly to provide a mechanism for positioning and locking an object such as, for example, a headrest or a lamp, in any position within a spherical range.

The conventional universal joint was first developed by Robert Hooke in the seventeenth century and has remained essentially unchanged since then. It generally involves input and output U-shaped rotatable coupling members which are intertwined and connected by a pin. This kind of coupling allows for universal movement of the output shaft with respect to the input shaft. There have also been developed several devices for locking an articulated universal joint in a particular position. For example, in U.S. Pat. No. 4,157,876 a lockable, universally articulated joint used in an orthopedic appliance is disclosed. The lockable, articulated joint has a hollow ball, or spherical member, which fits into a socket. The ball is formed with a circular opening in which a locking member is retained. The locking member has a convex outer surface which engages the mating concave inner surface of the ball. A locking screw extends through the socket and is threaded into the locking member. When the locking screw is loose, the locking member allows universal articulation between the socket and the ball, while preventing separation of the two relatively movable members. When the locking screw is tightened, however, the screw forces the outer surface of the locking member against the inner surface of the ball, which in turn clamps the outer surface of the ball against the socket so that the ball and socket are locked in a fixed relationship. Such prior art devices, however, have been found not to provide the precise positioning and positive locking which is required in some contexts, such as when supporting a headrest used in neurological surgery.

SUMMARY OF THE INVENTION

The lockable universal joint of the present inventon allows any device to which it is affixed, for example, the headpiece of a headrest or a lamp, to have universal movement and to be locked in any position to which it can be moved. The invention also provides a universal joint which is simple in construction and may be readily joined in series to other universal joints embodying the concepts of the present invention to permit adaptability to a wide variety of uses.

The lockable universal joint of the present invention provides a simple yet highly effective mechanism for securely and positively locking a universal joint in any position to which it can be moved. The joint of the present invention has particular applicability in any context in which it is necessary to precisely and positively located a device, such as in a headrest used for neurological surgery, or in the more familiar context of a reading, desk, or surgical lamp.

The universal joint of the present invention includes a housing having a plurality of axial bores through the housing. In a preferred embodiment there are two such bores which are at right angles with respect to each other. A rotatable shaft is fixed within each of the bores of the housing. Each rotatable shaft is composed of two parts, a first part and a second part. Both the first part and second part are retained on a central, axial, elongated member and each of the parts of the shaft are axially movable with respect to the elongated member. In a preferred form, the elongated member has a square cross-section and fits within an axial bore in the rotating shaft of like cross-section. Both the first part and the second part of the rotatable shaft have complementary, angled, facing end surfaces. In a preferred form of the invention it has been found that the lockable universal joint of the present invention functions most effectively when the angle of these faces is between 5° and 10° from a vertical plane.

A key element is interposed between the complementary, angled, facing end surfaces of each part of the rotating shaft. The key element is essentially circular and has an axial bore with a diameter large enough to afford free play on the elongated member through the shaft. The key element has anti-rotation means for restraining the key element against rotation about the central, axial elongated member. In a preferred form of the invention, the anti-rotation means comprises at least one radial projection, or nipple, on the outer periphery of the key element. The radial projection fits within a corresponding keyway formed within each of the axial bores within the housing so that the key element is restrained by the radial projections within the keywards against rotational movement. The key element is still free to move axially, however, and is not axially restrained by the keyways or radial projections. In a preferred form, there are two such radial projections on the key element, located on opposite sides of the key element and each fitting within a corresponding keyway in the axial bore. As each of the rotatable shafts rotates, the angled end surfaces cause the key element to move irregularly, or wobble, about the axis of the central, axial elongated member.

The present invention also includes actuating means mounted on the housing for applying an axial force to the rotating shafts and the key element. The axial force thus applied to the shafts serves to prevent the key element from wobbling and to securely and positively prevent each of the shafts from rotating within the housing and thus serves to lock the universal joint in a fixed position. In a preferred form of the invention the actuating means comprises a wedge member which engages a flat radial end surface of each of the rotating shafts. A bolt or similar device is threaded into the housing and engages the crown of the wedge member so that, as the bolt is threaded into the housing, the bolt applies a force to the wedge and the wedge in turn applies an axial force to each of the rotating shafts within the housing, which, because of the interaction of the angled faces and key element, prevents rotation of the shafts within the housing and thus locks the universal joint in a fixed position. As the bolt is threaded out of the housing, the force on the wedge and, consequently, the axial force exerted by the wedge on the rotating shafts, is released, thus permitting the shafts to rotate within the axial bores.

The present invention may be used singly or in combination with a number of other of such universal joints embodying the invention in order to adapt the universal joint for use in a particular environment. One such environment in which the invention has been successfully used and in which it is known to have particular advantages is as a headrest for precisely positioning and holding a patient's head during neurological surgery. In such a device, an appropriate number of the joints are linked in series fashion between a headpiece for supporting and restraining a person's head and an attachment means for attaching the headrest to a medical treatment station, such as an operating table. The invention may be used, however, in any context in which it is necessary or desirable to adjustably and precisely position and lock a device in a particular position. This may include, for example, without limitation, a reading, desk or surgical lamp, robotic arms, and manufacturing machinery.

DETAILED DESCRIPTION OF THE PREFERRED EMBODIMENT

Figure 1:
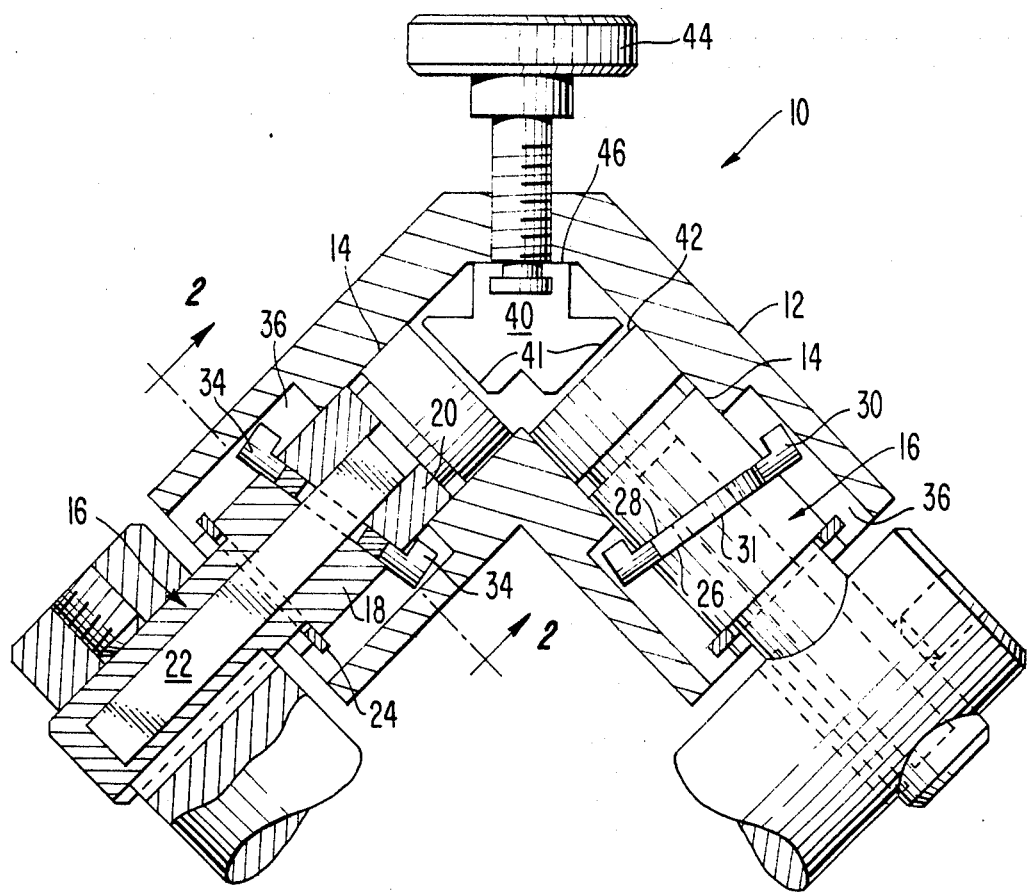
FIG. 1 is a cross-sectional view of the universal joint of the present invention.
Figure 2:
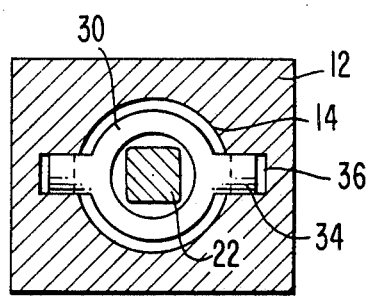
FIG. 2 is a cross-sectional view along line 2—2 of FIG. 1.

The universal joint 10 of the present inventon includes a housing 12 which has two axial bores 14 positioned at right angles to each other. Within each of the axial bores is a rotatable shaft 16. Each of the shafts and bores, and its associated locking mechanism, is identical in structure. For convenience and clarity, the description is written in the singular, but it will be understood to apply to each of the shafts 16 and bores 14 and their associated structure.

Shaft 16 is composed of two parts, a first part 18 and a second part 20. The shaft is retained on a central, axial, elongated member 22 and each of the two parts 18, 20 are axially movable with respect to the elongated member 22. The shafts 16 may be retained within housing 10 by a collar 24 or other suitable retaining means. In a preferred form, elongated member 22 has a square cross-section which fits closely within an axial passage within shafts 18 and 20 of like cross-section. Shafts 18 and 20 have complementary, angled, facing end surfaces 26, 28. It has been found through experimentation that the lockable universal joint of the present invention functions most effectively when the complementary, angled, facing surfaces 26, 28 of rotating shafts 18, 20 are angled between approximately 5° to 10° from a vertical plane. When the angle is significantly less than approximately 5°, that is, as the end faces approach a flat vertical plane, it is not possible to apply significant axial force using the simple actuating mechanism of the present invention, as explained below, to restrain the shafts from rotating within the housing. It has been found that when the angled surfaces of the shafts are between 5° and 10°, however, simple bolt pressure of the actuating mechanism is all that is required to obtain positive locking.

A key element 30 is interposed between the complementary, angled, facing end surfaces 26, 28 of shafts 18 and 20. The key element 30 is preferably an annular element having an axial bore 32 larger than the diameter of the elongated member 22 so that key element 30 is axially movable within the assembly and free to wobble about elongated member 22 when no axial force is applied to shafts 18, 20 as described below. Planar end faces 31 of key element 30 are perpendicular to the axis of axial bore 32.

Key element 30 includes means for restraining the key element against rotation about axial elongated member 22. In a preferred form, the anti-rotation means comprises two radial projections 34, or nipples, located 180° apart on the perimeter of key element 30. Radial projections 34 fit within axial, elongated keyways 36 formed on the inner surface of axial bore 14. Radial projections 34 fitting within keyways 36 serve to prevent key element 30 from rotational movement but permit the key element to move axially and to move in response to the cam action of the angled faces on shafts 18, 20.

In order to securely lock rotatable shaft 16 in a particular position within housing 12, it is necessary to apply an axial force to the shaft and thus force angled surfaces 26, 28 against the key element 30 which serves to prevent key element from wobbling about member 22 and thus to securely lock both shaft 18 and shaft 20 against rotational movement within bores 14.

Figure 3:
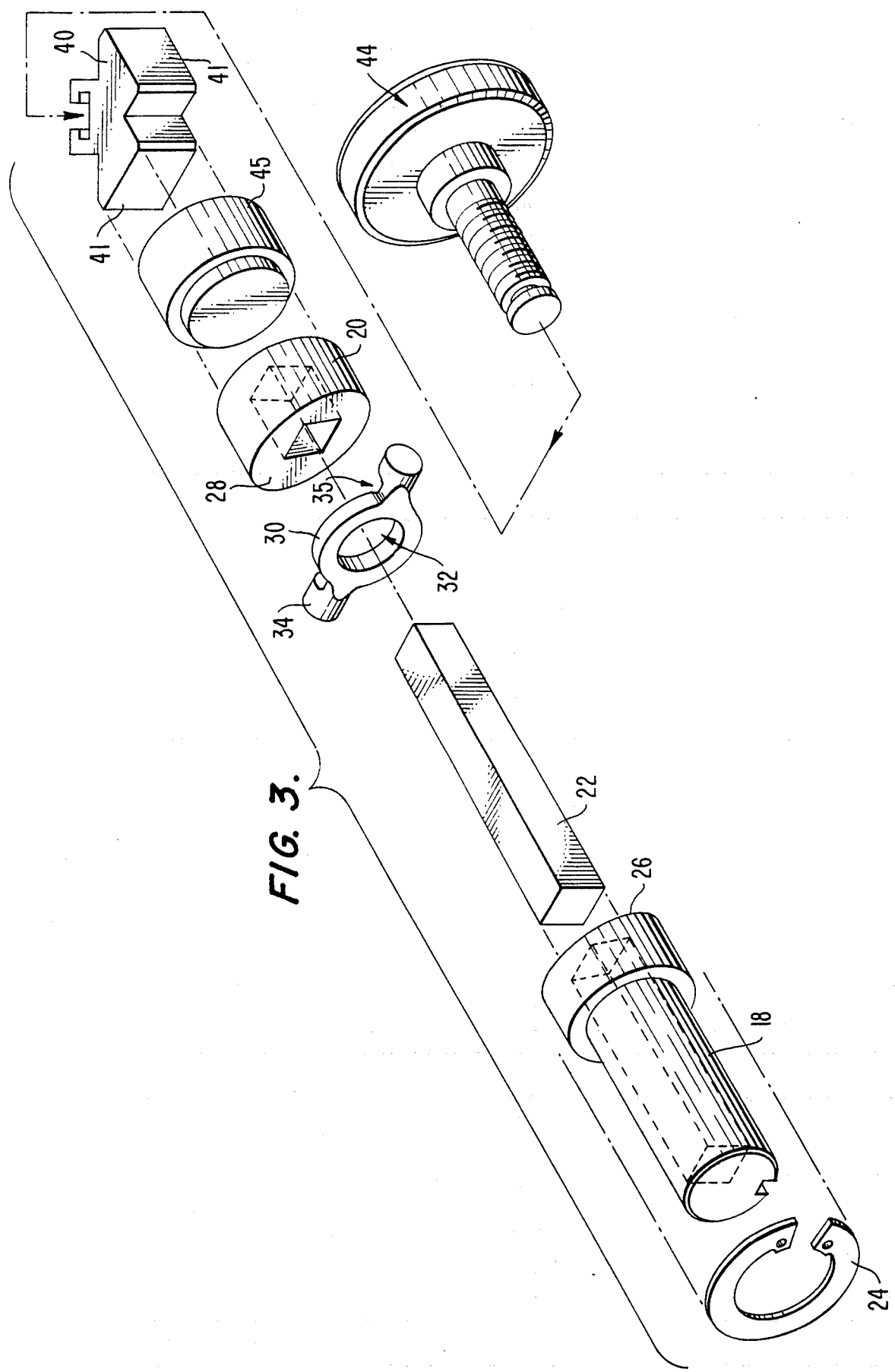
FIG. 3 is an exploded view of a rotatable shaft and lock actuating mechanism of the present invention.

It is desirable to be able to lock both rotating shafts 16 within housing 12 with a single adjustment. Accordingly, the present invention provides an actuating system using a single bolt or adjusting screw. A bolt and wedge arrangement is mounted on housing 12 for applying an axial force to each of shafts 16 to prevent each of the shafts from rotating within the housing and thus to lock the universal joint in a fixed position. The actuating means preferably includes a wedge member 40 which has a flat planar surface 41 engaging an axial end surface 42 of shaft 16. A bolt member 44 is threaded into housing 12 and engages apex 46 of wedge member 40. When bolt 44 is threaded into housing 12, the bolt applies a force to apex 46. This force is transmitted by wedge 40 through wedge surfaces 41 as an axial force to each of the rotating shafts. An spacer element 45 may be interposed between wedge 40 and shaft 20 to transmit force from wedge 40 to shaft 20, as shown in FIG. 3. The axial force from wedge 40 forces together shafts 18, 20 and key element 30 and restrains key element against its wobbling motion and thus serves to positively restrain shafts 18 and 20 from rotating within bore 14. This serves to lock the universal joint in any position to which it can be moved. As bolt 44 is threaded out of housing 12, the force applied to apex 46 of wedge 40 is released and, consequently, the axial force applied by the wedge to shaft 16 is released and the shaft is again permitted to rotate within axial bores 14.

Figure 4:
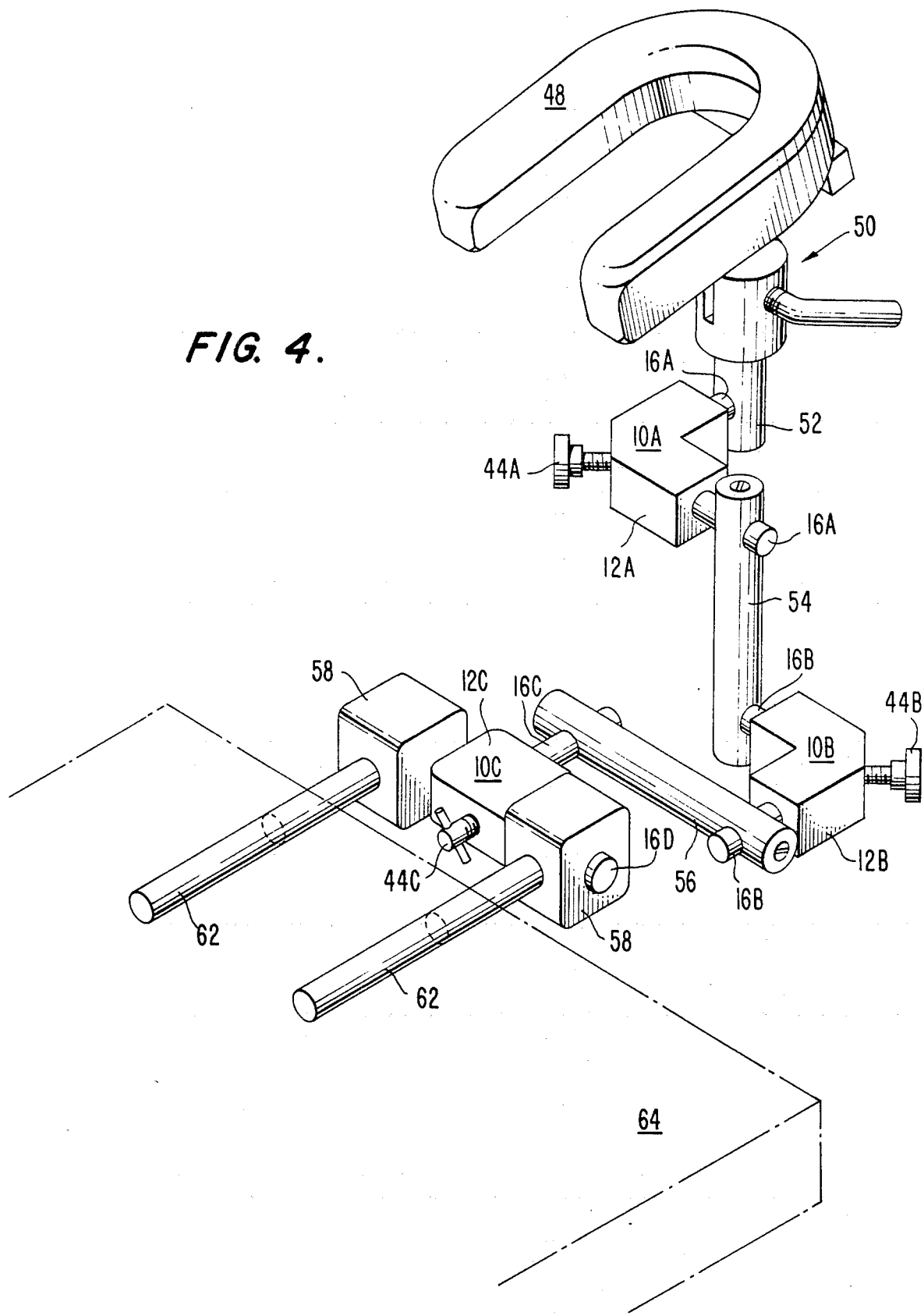
FIG. 4 is a perspective view of two of the universal joints of the present invention linked in series and adopted to support a headpiece of a head rest.

As shown in FIG. 4, the locking universal joint 10 of the present invention may be used in series to adapt the invention for a particular use, for example, a headrest used in neurological surgery. As shown in FIG. 4, a surfical headrest incorporating the present invention includes a headpiece 48 which is fixed to a conventional, lockable, two-way adjustment mechanism shown generally at 50, permitting headpiece 48 to pivot thereon. This pivot assembly may be eliminated, however, and headpiece 48 may be attached directly to a universal joint of the present invention. Adjustment mechanism 50 includes an extension shaft 52 which is rotatably fastened to a first universal joint 10A incorporating the concepts of the invention, as described above. In describing the universal joints used in the headrest of FIG. 4, the reference numerals used above will be used, followed by a letter designation, to describe common elements. Universal joint 10A has rotating shafts 16A which rotate within housing 12A. Joint 10A includes a bolt member 44A. Joint 10A functions as described above to allow headpiece 48 to be adjustably and precisely located and locked in any position within the spherical range of joint 10A.

As shown in FIG. 4, one end of one of rotating shafts 16A of joint 10A is fixed to extension shaft 52. The other of rotating shafts 16A is rotatably fastened to one end of a second extension shaft 54. The other end of extension shaft 54 is rotatably fastened to one of rotating shafts 16B of a second universal joint 10B. Joint 10B includes a bolt member 44B and functions as previously described. As shown in FIG. 4, housing 12A can be precisely located and locked in any position within the spherical range of joint 10B.

A second rotating shaft 16B of joint 10B is rotatably fastened to one end of a third extension shaft 56. The other end of the extension shaft 56 is rotatably fastened to a third joint 10C enbodying the principles of the invention heretofore described. Joint 10 includes shafts 16C rotatable within housing 12C. An actuating screw 44C is fixed to housing 12C. In order to permit joint 10C to be fastened to a support base, shaft 16 extends through housing 12C and is fixed at its outer ends to support blocks 58 which permit it to rotate about the its axis. Blocks 58 include attachment means, such as rods 62, which may be fixed to any support base 64. In the context shown in FIG. 4, support base 64 would be a medical station, such as an operating table or chair.

Of course, it will be appreciated that the invention has applicability to any use in which it is desired to adjustably and accurately place and lock an object in a particular position. In particular, the invention may be used in conjunction with a lamp, medical device or manufacturing machinery.

Although the invention has been described with particularity with respect to a preferred embodiment, the invention is not to be limited thereby. The invention is defined and limited only by the following claims.

I claim:

1. A universal joint comprising:
   a housing having two axial bores disposed at a 90° angle to each other;
   a shaft within each of said axial bores and each of said shafts rotable within its respective bore, said shafts having a first part and a second part, said first part and said second part each retained on a central axial, elongated member, said first part and said second part having complementary angled facing end surfaces;
   a plurality of key elements interposed between said facing end surfaces of said first part and said second part of each of said shafts, each of said key elements having anti-rotation means for restraining said key element against rotation about said central, axial, elongated member;
   a spacer element disposed in abutting relationship with each respective second part at an end thereof remote from said angled facing end; and
   actuating means mounted on said housing for applying an axial force to said shafts, said key elements and said spacer elements and thus locking said joint in a fixed position, wherein said actuating means comprises a wedge member engaging an axial end surface of each of said spacer elements and a bolt member threaded into said housing and engaging said wedge member so that, as said bolt member is threaded into said housing, said bolt member applies a force to said wedge member and said wedge member applies an axial force to each of said shafts through said spacer elements, and as said bolt member is threaded out of said housing, the force on said wedge member and on said shafts is released, thus permitting said shafts to rotate within said axial bores.

2. A universal joint as recited in claim 1 wherein said anti-rotation means comprises at least one radial projection on the periphery of each of said key elements, said radial projections fitting within keyways within each of said axial bores, so that said key element is restrained by said radial projections within said keyways against rotational movement.

3. A universal joint as recited in claim 1 wherein said complementary angled, facing end surfaces of said shaft are angled less than 45°.

4. A universal joint as recited in claim 4 wherein said complementary angled, facing end surfaces of said shaft are angled less than 10°.

5. In a headrest for precisely and adjustably positioning and restraining a person's head, said headrest having a headpiece for supporting and restraining a person's head, attachment means for attaching the headrest to a support base, and a plurality of adjustable shafts interconnecting said headpiece and said attachment means, wherein the improvement comprises at least one universal joint interconnecting said adjustable shafts, said universal joint comprising:
   a housing having a plurality of axial bores;
   a shaft within each of said plurality of axial bores and each of said shafts rotatable within its respective bore, said shafts having a first part and a second part, said first part and said second part each retained on a central axial, elongated member, said first part and said second part having complementary angled facing end surfaces;
   a plurality of key elements interposed between said facing end surfaces of said first and second parts of each of said shafts, each of said key elements having anti-rotation means for restraining said key element against rotation about said central, axial, elongated member;
   a spacer element disposed in abutting relationship with each respective second part at an end thereof remote from said angled facing end; and
   actuating means mounted on said housing for applying an axial force to said shafts, said key elements and said spacer elements and thus locking said joint in a fixed position, wherein said actuating means comprises a wedge member engaging an axial end surface of each of said spacer elements and a bolt member threaded into said housing and engaging said wedge member so that as said bolt member is threaded into said housing said bolt member applies a force to said wedge member and said wedge member applies and axial force to each of said shafts through said spacer elements an, as said bolt member is threaded out of said housing, the force on said wedge member and on said shafts is released, thus permitting said shafts to rotate within said axial bores.

6. In a headrest as recited in claim 5 wherein said anti-rotation means comprises at least one radial projection on the periphery of each of said key elements, said radial projections fitting within keys within each of said axial bores, so that said key element is restrained by said radial projections within said keyways against rotational movement.

7. In a headrest as recited in claim 5 wherein said housing has two axial bores and said axial bores are at a 90° angle with respect to each other.

8. In a headrest as recited in claim 5 wherein said complementary angled, facing end surfaces of said shaft are angled less than 45°.

9. In a headrest as recited in claim 5 wherein complementary angled, facing end surfaces of said shaft are angled less than 10°.

* * * * *